United States Patent [19]

Briggs

[11] 3,999,065
[45] Dec. 21, 1976

[54] LEAK DETECTION SYSTEM WITH WIRE PROBE

[75] Inventor: Walton E. Briggs, Lynnfield, Mass.
[73] Assignee: Varian Associates, Palo Alto, Calif.
[22] Filed: June 5, 1974
[21] Appl. No.: 476,632
[52] U.S. Cl. ............................... 250/281; 250/288
[51] Int. Cl.² ......................................... H01J 39/34
[58] Field of Search .......... 250/281, 282, 288, 289, 250/505

[56] References Cited
UNITED STATES PATENTS

| | | | |
|---|---|---|---|
| 2,486,199 | 10/1949 | Nier | 250/288 |
| 2,878,387 | 3/1959 | Chesterman | 250/289 |
| 3,187,179 | 6/1965 | Craig et al. | 250/289 |
| 3,257,560 | 6/1966 | Jones | 250/505 |
| 3,520,176 | 7/1970 | Becker | 250/282 |
| 3,624,389 | 11/1971 | Cohen et al. | 250/288 |
| 3,733,907 | 5/1973 | Briggs | 250/288 |
| 3,867,631 | 2/1975 | Briggs et al. | 250/288 |

Primary Examiner—Alfred E. Smith
Assistant Examiner—B. C. Anderson
Attorney, Agent, or Firm—Stanley Z. Cole; Leon F. Herbert; John J. Morrissey

[57] ABSTRACT

A leak detection system comprising a mass spectrometer tuned to detect the presence of helium in a gas sample, and a gas sample inlet member comprising a multichannel array of capillary passages. In an ideal embodiment, the gas sample inlet member comprises a segment of commercially obtainable multistrand electrical wire encased in an insulating plastic sheath. The spaces between the individual strands provide the capillary passages for the admission of the gas sample.

8 Claims, 2 Drawing Figures

LEAK DETECTION SYSTEM WITH WIRE PROBE

BACKGROUND OF THE INVENTION

Mass spectrometer leak detectors are well known. One type of interface in use between such a detector and atmosphere consists of a probe having a small orifice with a gas admittance of about $10^{-3}$ cubic centimeters per second from the atmosphere into the vacuum region of the leak detector. Such a low admittance is necessary to prevent the entry of a large quantity of gas per unit of time which would result in damage to the delicate mass spectrometer. In operation, the probe would be moved along the wall of a chamber containing a test gas such as helium. When a leak is encountered, the test gas passes through the orifice of the probe and is detected by the mass spectrometer which is tuned to detect the presence of that particular test gas. A serious problem with such orifice probe devices is that the orifice easily becomes clogged with airborne dust or moisture. Thus, even if a leak is encountered, the test gas may not be able to pass through the clogged orifice in sufficient quantity to indicate the correct magnitude of the leak, or in the extreme case the test gas may not be able to pass through the orifice at all.

An improvement over the earlier orifice probe was disclosed in pending U.S. patent application Ser. No. 293,206, which was filed on Sept. 28, 1972, now U.S. Pat. No. 3,828,527 and assigned to Varian Associates, wherein an interface membrane of polytetrafluoroethylene was described. The polytetrafluorethylene membrane probe was not subject to the clogging problems that beset the earlier orifice type of probe.

SUMMARY OF THE INVENTION

The object of the present invention is to provide a leak detection apparatus having a gas inlet interface which is rugged and simple in construction.

A more specific object of this invention is to provide a gas inlet interface which is free of the clogging problems that beset the orifice type of probe known to the prior art, and which is capable of admitting a larger sample of gas per unit time than is possible with the membrane type of probe disclosed in pending U.S. patent application Ser. No. 293,206.

In the preferred embodiment of this invention, the gas inlet interface of the mass spectrometer leak detection apparatus comprises a segment of wire having a plurality of strands.

DESCRIPTION OF THE PREFERRED EMBODIMENT

Figure 1:
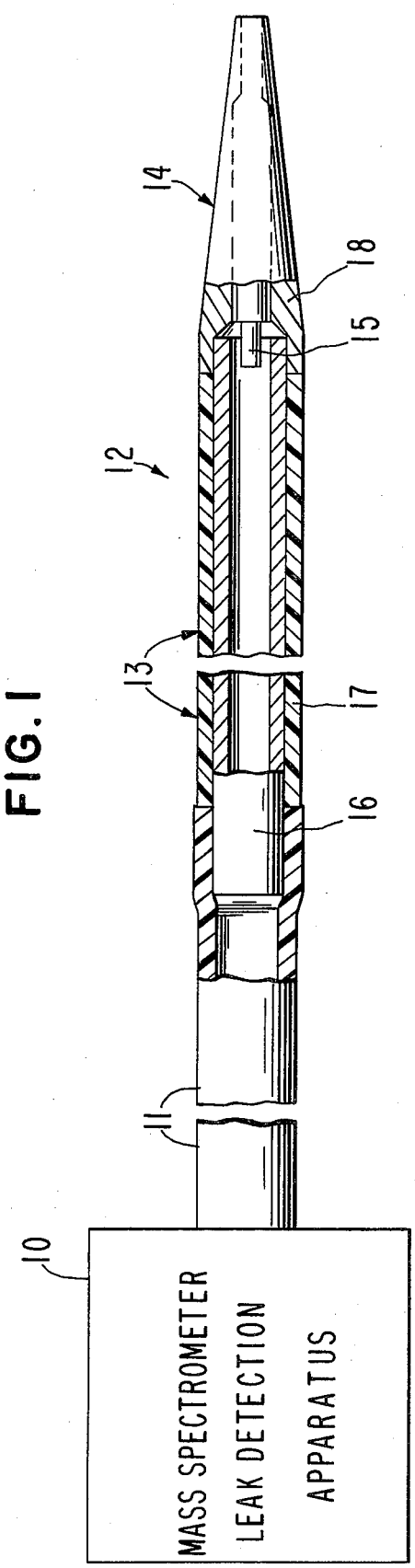
FIG. 1 is a partly schematic view of a mass spectrometer leak detection system in which the interface member is disposed in a portable probe.

The leak detection system of the present invention, which is shown partly in schematic view in FIG. 1, includes a conventional mass spectrometer leak detection apparatus 10 having a gas inlet passage thereto as by means of tubing 11. The conventional apparatus 10 comprises a mass spectrometer such as, for example, the instrument described in U.S. Pat. No. 3,277,295 issued on Oct. 4, 1966, and a high-vacuum pumping system for creating and maintaining a high vacuum in the mass spectrometer.

The presence of a leak in a test piece is detected by causing a test gas such as helium to be present in the gas that would pass through any leak which might occur. For example, if the test piece were an enclosed container, a quantity of helium would be injected into the container. If a leak were present in the container envelope, helium would pass out through the leak. The leak detection system would detect and locate the leak by sensing and locating the source of the helium test gas on the external side of the container envelope. The mass spectrometer of the leak detection system would be tuned to detect the presence of helium, and the location of the leak would be pin-pointed by passing a probe 12 over the surface of the test piece. Any gas, including the test gas, emanating from a leak would enter the probe 12 and pass through the tubing 11 into the mass spectrometer leak detection apparatus 10 because of the lower pressure therein relative to the pressure of the ambient atmosphere. An especially suitable leak detection apparatus is marketed by Varian Associates under the trademark Porta-Test.

In the preferred embodiment of this invention, tubing 11 is made of a flexible plastic material to facilitate mobility of the probe 12 which is affixed at the distal end thereof. It has been found that a tubing material marketed by Norton Company under the trademark Tygon is especially suitable. Tubing 11 may appropriately have an outside diameter of ⅜-inch and a wall thickness of 3/32-inch, and may have any convenient length depending upon the convenience of the operator. The distal end of tubing 11 receives the probe 12, which may appropriately be about 6 inches or longer in length. The probe 12 comprises a handle portion 13 which is held by the operator, and a head portion 14 in which an interface member 15 is mounted. The probe 12 is held by the operator in such a way that the interface member 15 can be passed along in closely adjacent proximity to the suspected leak area on the surface of the test piece. Any gas, including the test gas, emanating from a leak would enter the probe 12 through the interface member 15.

The handle portion 13 of the probe 12 comprises a stainless steel tube 16 which may be about 6 to 30 or more inches in length, depending on the accessibility of the area to be probed for leaks. The tube 16 may conveniently have an outside diameter of ¼-inch and a wall thickness of approximately 1/16-inch. The end of the stainless steel tube 16 proximal to the leak detection apparatus 10 is received within the distal end of the flexible tubing 11 by being inserted therewithin to a length of approximately ½-inch. The stretch-fitting of the distal end of the tubing 11 to overlap the proximal end of the stainless steel tube 16 causes a gas-tight joint between the tubing 11 and the tube 16. The tube 16 is preferably covered by a sleeve 17 of plastic material to provide a comfortable handle. The sleeve 17 may be made of a material marketed by I-T-E Imperial Corporation under the trademark Poly-Flo, and may suitably have an outside diameter of ⅜-inch.

The head portion 14 of the probe 12 comprises a nozzleshaped stainless steel member 18 which fits over the distal end of the stainless steel tube 16. As can be seen in greater detail in FIG. 2, the distal end of tube 16 is received within a mating flanged portion of the nozzle-shaped member 18. A gas-tight seal between the tube 16 and the nozzle-shaped member 18 is formed as by brazing. The outside diameter of the nozzle-shaped member 18 at its extremity adjacent the tube 16 is the same as the outside diameter of the sleeve 17, and the distal end of sleeve 17 abuts the proximal end of the nozzle-shaped member 18 in tightly fitting contact so as to form a smooth continuous external surface for the probe 12 at the transition from the plastic sleeve 17 to the metal nozzle-shaped member 18.

Figure 2:
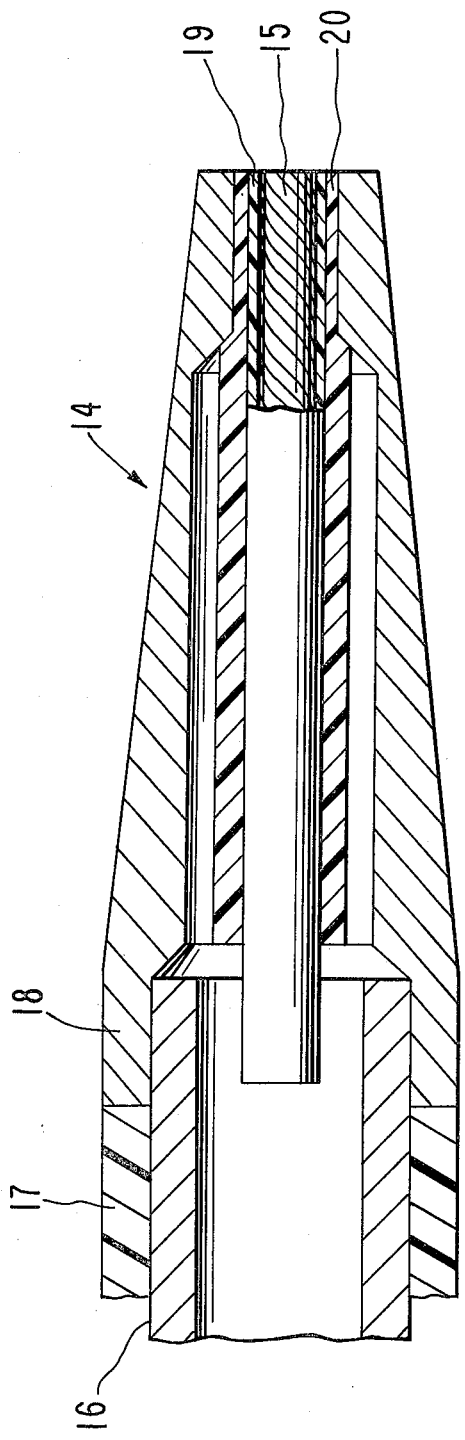
FIG. 2 is an enlarged cross-sectional view of the inlet end of the probe shown in FIG. 1, with the interface member and its support enlarged out of scale for clarity.

The head portion 14 serves to support the interface member 15. The interface member 15, according to this invention, is a segment of ordinary electrical wire, having a plurality of strands encased in an insulating plastic sheath. A particularly suitable type of wire would be any commercially available 22-gauge 7/30 copper wire. The "7/30" designation indicates that the wire consists of seven strands, each strand being of 30-gauge. In the typical case, the individual strands are helically twisted around the axis of the wire so formed, as indicated in FIG. 2. The interface member 15 is preferably covered along its length by an insulating sleeve 19. The insulating sleeve 19 might be of a material commercially available under the trademark Teflon. The interface member 15 extends from the distal end of the nozzleshaped member 18 into the interior of the stainless steel tube 16, and is appropriately supported within the nozzle-shaped member 18 by, for example, a segment 20 of Tygon tubing. As is shown in FIG. 2, the tubing segment 20 tightly encases the interface wire member 15 with its insulating sleeve 19, and also fits snuggly within the bore of the nozzle-shaped member 18 at the distal end thereof. The Tygon tubing segment 20 might conveniently have an outside diameter which is approximately 0.005 inch smaller than the bore of the nozzle-shaped member 18. The wall thickness of the tubing segment 20 must be suitable to permit the tubing segment 20 to be stretched over the wire segment 15 and the insulating sleeve 19, while fitting snugly within the bore of the nozzle-shaped member 18 so as to provide a gas-tight seal between the interface wire segment 15 and the nozzle-shaped member 18 when the assembly comprising the members 15, 19 and 20 is inserted into the member 18.

When a leak occurs, the test gas passes through the wire interface member 15 to the mass spectrometer leak detection apparatus 10 through the multiplicity of channels between the strands of the wire 15. In effect, the channels between the various strands of the wire 15 provide a multiplicity of orifices. With a single-orifice probe according to the prior art, airborne dust and water vapor in the atmosphere would readily clog the orifice and thereby prevent passage of the test gas into the mass spectrometer in sufficient quantity to indicate the correct magnitude of a leak. In the extreme case, the test gas would be completely prevented from entering the mass spectrometer so that there could be no indication at all of the presence of the leak. With the multistrand wire interface probe of the present invention, however, it has been found that the clogging problems experienced with the single-orifice type of probe do not occur. In fact, it has surprisingly been found that a multistrand wire interface probe according to this invention may be held under water for a long period of time (on the order of several minutes), and upon removal from under the water can be used to detect the presence of the test gas as soon as the leak detector pumps have removed the water vapor from the vacuum system (usually in less than a minute). The non-clogging feature of the multistrand wire interface member of this invention can be attributed, in the first instance, to the fact that the cross-sectional dimension of each channel between several adjacent strands is much smaller than could be achieved by deliberately fashioning or machining an orifice in an interface wall. Perhaps of more importance, however, is the fact that the many channels between the various strands of the wire interface member all communicate with each other. Thus, as one, or two, or more channels become clogged, there will remain a plurality of other channels which are unclogged.

The gas inlet interface of the present invention, being simply a segment of multistrand wire, is extremely rugged. The length of the wire segment 15 can be chosen to provide the desired admittance rate for the gas sample. The spaces between the individual strands of the wire 15 provide capillary passages for the admission of the gas sample, and the conductance of gas through a capillary varies exponentially with the diameter and inversely with the length of the capillary. Thus, for a given kind of electrical wire used as the interface member 15 of this invention, the gas conductance can be increased by shortening the length of the wire segment used, and the gas conductance can be decreased by lengthening the wire segment used. The gas sample admittance rate is a measure of the sum of the conductances of all the capillary passages provided by the wire segment 15. For a particular leak detection system, a desired gas sample admittance rate can therefore be obtained simply by selecting an appropriate length for the wire segment 15.

A one-square inch polytetrafluorethylene membrane type of interface member, as described in U.S. patent application Ser. No. 293,206, provides an admittance of approximately $10^{-4}$ cubic centimeters per second. It has been found that a 1-inch long multistrand wire provides an admittance of approximately $10^{-1}$ cubic centimeters per second, which means that a probe having a multistrand wire interface member according to this invention can admit a 1000 times larger gas sample per unit time than would be possible with a polytetrafluoroethylene membrane. Stating this another way, for a given volume of gas per unit of time, a multistrand wire interface member according to this invention need have only 1/100 of the cross-sectional diameter of a polytetrafluoroethylene membrane interface member. The multistrand wire interface member of this invention has not been noted to be preferential in the admittance of helium, whereas such preferential admittance of helium is a significant feature of the polytetrafluoroethylene membrane. Nevertheless, in applications where the quantity of helium test gas can be controlled to assure that a clearly distinguishable helium signal will be perceived in any leak that may occur, the multistrand interface member of this invention provides a very significant advantage over the polytetrafluoroethylene membrane interface member. Because the multistrand interface member can be smaller in diameter than the polytetrafluoroethylene membrane interface member by a factor of 100, the multistrand interface member can pin-point a leak with greater precision. The leak can in fact be precisely located at the very narrow tip of the probe of the present invention.

It is to be understood that the dimensions of the probe 12 disclosed herein have been found to be convenient, and are not necessarily required for the practice of this invention. The multistrand wire interface member 15, for example, may be of any convenient cross-sectional diameter. For extremely precise pinpointing of leak locations, it may be desirable to minimize the cross-sectional diameter of the wire to the point where it would be more proper to speak of "threads" rather than "strands." Similarly, the technique disclosed herein for mounting the interface member 15 in the probe 12 is considered to be one of a number of possible mechanical expedients. Also, the materials out of which the various components of the probe are made are considered to be largely a matter of choice. The invention herein lies in the leak detection system having a gas inlet interface which is free of the clogging problems which beset many of the gas inlet interfaces known to the prior art, and which is capable of admitting a larger sample of gas per unit time than is possible with non-clogging interfaces of comparable dimensions known to the prior art.

It is far easier to manufacture large numbers of the gas sample inlet member of this invention to consistently uniform tolerances than it is to manufacture the gas inlet members known to the prior art. Furthermore, it is far easier to preadjust the gas sample inlet member of this invention to a desired gas sample admittance rate than it is to preadjust the gas sample inlet members known to the prior art.

What is claimed is:

1. In a leak detection system comprising a mass spectrometer tunable to detect the presence of a test gas, and a gas sample inlet member for admitting a limited flow of gas to the inlet of said mass spectrometer, the improvement comprising said inlet member being configured to provide a plurality of restricted passages therethrough, said passages being formed by the interstices between a plurality of individual strands of material held in side by side relation, and the axes of said strands being substantially parallel to the direction of flow of said gas through said passages.

2. The leak detection system of claim 1 wherein said plurality of individual strands of material held in side by side relation are formed by a length of multistrand wire.

3. The leak detection system of claim 1 wherein said inlet member is disposed adjacent one end of a probe structure.

4. The leak detection system of claim 3 wherein said probe structure comprises a handle portion and a nozzle-shaped head portion, said head portion being affixed to said handle portion, said inlet member being mounted within said head portion.

5. The leak detection system of claim 4 wherein said inlet member comprises a segment of multistrand wire.

6. The leak detection system of claim 2 wherein the strands of said multistrand wire are wound helically around the axis of said wire, and wherein said wire is encased within an electrically insulating sleeve.

7. A gas sample inlet member for use in a leak detection system, said inlet member comprising a tubular probe, an interface member sealed within the bore of said probe, said interface member being configured to provide a plurality of restricted passages for limited gas flow therethrough, and said passages being formed by the interstices between a plurality of individual strands of material held in side by side relation, and the axes of said strands being substantially parallel to the direction of the gas flow through said passages.

8. The gas sample inlet member of claim 7 wherein said plurality of individual strands of material held in side by side relation are formed by a length of multistrand wire.

* * * * *